April 2, 1957     A. C. PETERSON     2,787,386
PUBLIC PARKING GARAGE MEANS
Filed Aug. 27, 1953     6 Sheets-Sheet 1

INVENTOR

Adolph C. Peterson

April 2, 1957   A. C. PETERSON   2,787,386
PUBLIC PARKING GARAGE MEANS
Filed Aug. 27, 1953   6 Sheets-Sheet 2

INVENTOR
Adolph Peterson.

April 2, 1957 A. C. PETERSON 2,787,386
PUBLIC PARKING GARAGE MEANS
Filed Aug. 27, 1953 6 Sheets-Sheet 6

INVENTOR
Adolphe C. Peterson.

United States Patent Office 2,787,386
Patented Apr. 2, 1957

2,787,386

PUBLIC PARKING GARAGE MEANS

Adolphe C. Peterson, Minneapolis, Minn.

Application August 27, 1953, Serial No. 376,779

7 Claims. (Cl. 214—16.1)

My invention relates to storage means for automotive units and particularly to a means for the parking of automobiles for public use, and it is therefore called public parking garage means.

The principal objects of my invention are to provide a means available in public use for the parking of automobiles or other automotive devices, such as airplanes, helicopters, public conveyances, traveling units of any description, which means shall enable more efficient use of space provided for parking, especially in congested population centers or marketing centers, and which shall provide that more efficient means in a means which shall be relatively low in the required capital outlay for construction. In the means, which are now generally used for such purposes, large amounts of floor space and ramp space are now required in order that automobiles may enter and depart from parking space, and in my present means it is proposed and designed to eliminate this large need for floor and ramp space for the entry and departure of automobiles. In my means it is also designed to provide such a construction and means that in any use thereof, the entry and departure of automobiles is accomplished in such a manner, that automobiles may enter and leave in rapid succession, and even in a multiple number of lanes, so that they may even at such hours and times as necessary, enter or leave in considerable number for any unit of time. A limitation in the use of any public parking means, is that imposed by the necessity of entry or departure of automobiles from any limited parking space, within a prescribed limit of time, so that the persons using the means will not be unduly delayed in storing their automobiles or receiving them when desired, and it is a particular object of this invention, that the entry or departure of automobiles, may be from a number of lanes and from a number of so-called storage spaces at the same time, in any single parking construction. An object is especially to provide such an efficient and useful parking structure, as may be used, either in public specially built parking garages intended solely for car parking, or such as may be used in parts of any structures such as store building structures, public buildings such as government buildings, or as may be used for parking purposes within the confines of streets or avenues, utilizing portions of such streets or avenues, for parking means, without in such case unduly obstructing traffic along such avenues. And my means may be used for storing or parking of other traveling objects such as airplanes and other traveling units, by incorporation of my device in the construction of ships for travel on sea, or in hangar means for air-fields. An especial object is provision of this means for use as incorporated in highways or alongside of highways with access to or from the highways by approaches therefrom and thereto.

This application is a continuation-in-part of my now abandoned prior application Serial Number 26,386, filed May 11, 1948.

The principal devices and combinations of devices comprising my invention, are as hereinafter described and as more particularly defined in the appended claims. In the accompanying drawings, which illustrate my invention, like characters refer to like parts throughout the figures, in so far as practicable. Referring to the drawings:

Figures 1, 2, and 3, illustrate a so-called container or container unit which is used in multiple number in connection with other devices forming my invention, and of these figures.

Figures 4, 5, 6, 7 are figures which chiefly show a so-called travel elevator unit or travel unit which is used in association with a multiple number of the container units shown in Figures 1, 2, these figures showing a preferred form of such travel unit, and of these figures; Figure 11 shows incorporation of my device in a highway. My invention embodies as one essential element of the device, a container unit which will be used in plural number with one so-called travel unit or with several travel units or travel elevator units, as they may otherwise be called, and the assemblage of these containers may vary in any installation, as hereinafter described. The container unit will be first described and subsequently the travel elevator unit will be described. Referring to Figures 1, 2, and 3, showing the container unit, this container unit may be constructed with a number of car storage spaces suitable for a selected location and a selected construction of a travel elevator unit to be associated with the container units. The container unit, as shown in the figures mentioned, will in plan be approximately twenty by thirty to forty feet, and it will be approximately forty feet or thereabouts in height, and will accommodate for storage twelve automobiles of the usual passenger car type, such as commonly privately used. The containers may be constructed in other sizes and for storage of other numbers of units.

Figure 1:
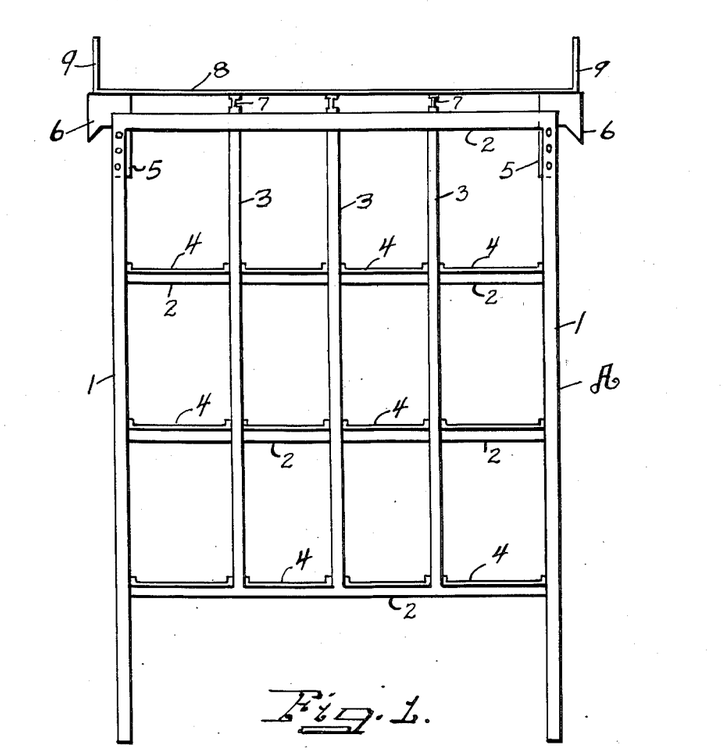
Figure 1 is a view of the container unit in vertical side elevation.
Figure 2:
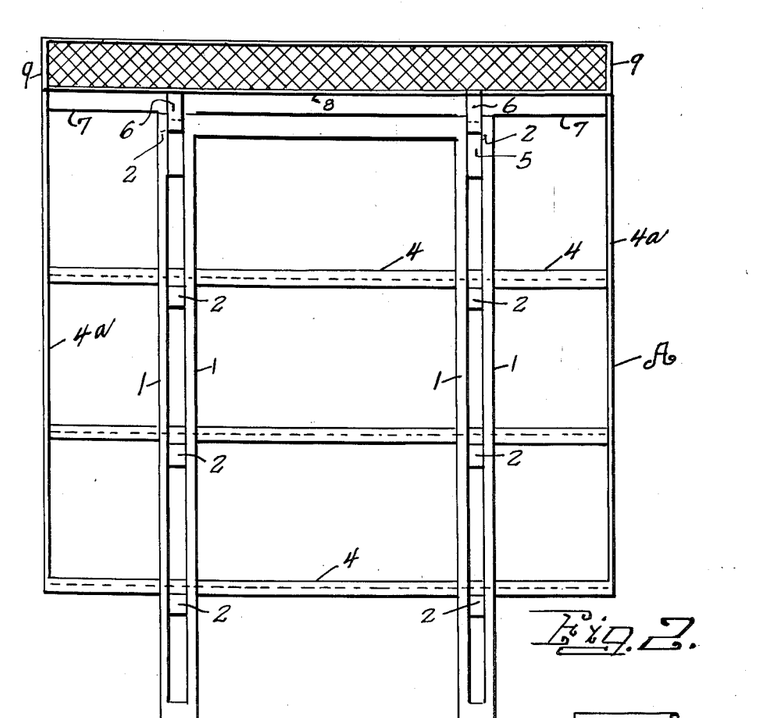
Figure 2 is a view in vertical end elevation of a side or end at right angles to the side shown in Figure 1.

The container unit, designated generally as A in the drawings, is formed of steel or aluminum or other strong material, suitable for the construction, and it has at each end two strong vertical members 1, each of these being constructed preferably of two steel beams or standards as shown, and it has transverse horizontal steel or other beams 2 extended under each storage level and also along the space over the upper storage level. Intermediate vertical members 3 extend from the top members 2 to the bottom members 2. Over each level of beams 2, except the top level or tier, there are secured by welding or otherwise, car floors or shelves which may be of steel or aluminum denoted 4, there being one car floor 4 for each storage space for an automobile, this car floor being approximately twenty feet in length and seven and one-half to eight feet wide, as may be determined, for any particular construction, to be necessary. The car floors may be constructed in any economical and desirable way, so that they perform the function designated herein. Each of the members 1 comprising two parallel vertical members has securely fixed between them at their upper ends by welding and bolting or otherwise, a hook-member or supporting member 5, there being four of these hook-members 5 thereby fixed in the upper end of the container unit, two at each end thereof, each having a hook 6 extending laterally from the end of the container unit, approximately on the level of the upper transverse horizontal beam 2. These hook-members 5 must be strong enough and their attachment to the container unit A must be strong enough so that the entire weight of the container unit may be supported by the four hook-members.

Figure 3:
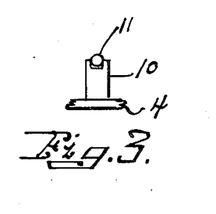
Figure 3 is a detail figure showing a small part of one car floor or shelf for storage space and an attached pole bracket and pole placed in the bracket, these details being omitted in the other figures but shown merely as one detail form of car holding means which may or may not be used with the container units.
Figure 4:
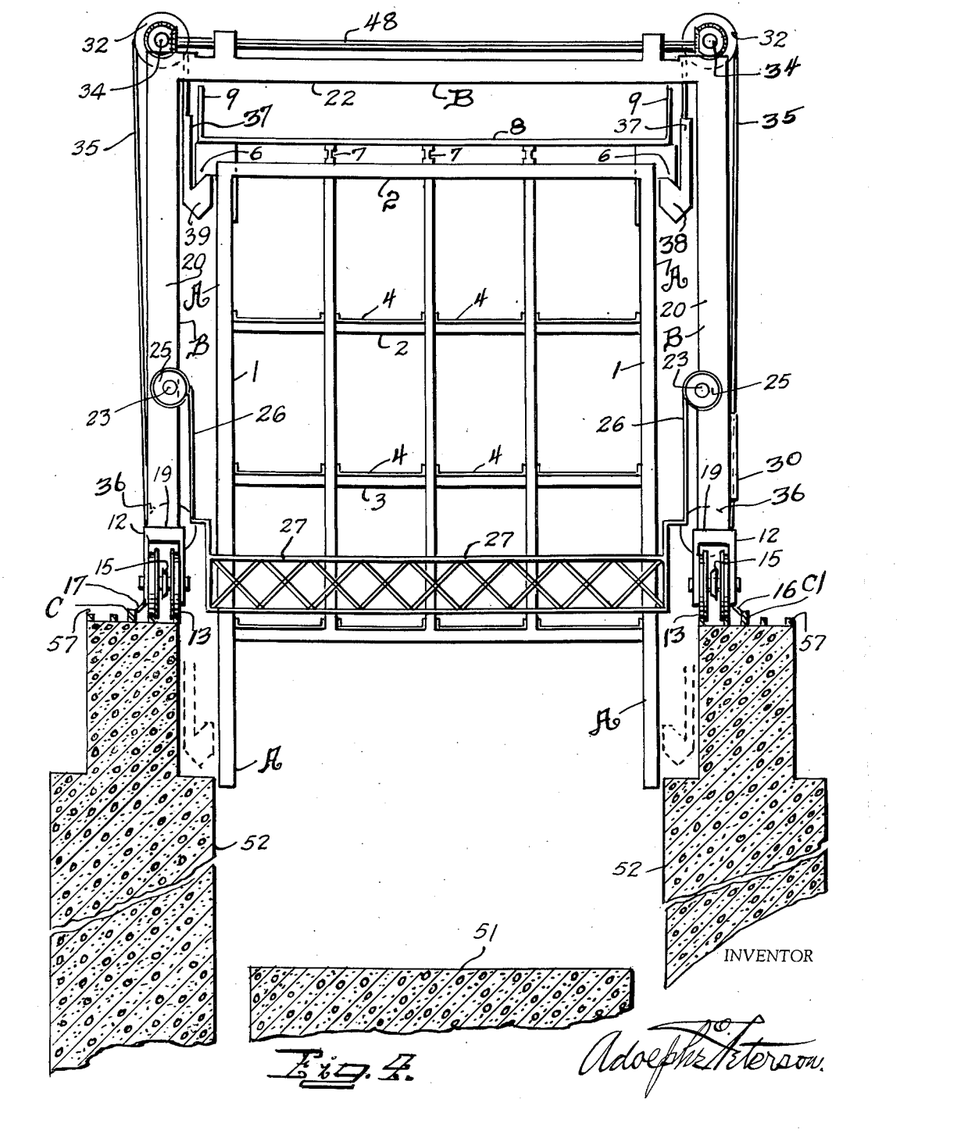
Figure 4 is a view chiefly in front elevation (an end or side looking from a position in the line of a container unit series of course) this view showing also a section through adjoining side walls of the container unit structure or enclosure, this section being on the line 4—4 of Figure 5, this view showing also the front or side elevation of one container unit A which is in the elevated position within the structure of the travel unit B.

Transverse roof beams 7 are secured to the upper level of horizontal beams 2 on their upper sides, and on the upper sides of these roof beams 7 there is secured a so-called course floor section, 8, this being approximately twenty feet wide, transversely of the container unit and approximately as long in the direction of the side of the container unit as the container is long horizontally, plus approximately the distances by which the hooks 6 protrude from the container ends. This course floor section may otherwise be called roadway section, and it will when in the normal, lowered position of a container unit serve as a driving course or roadway section, which in connection with the similar tops of other container units will serve as a drive-away course or entry course for automobiles. The container unit has secured at each end (Fig. 2) (Fig. 1) on the upper side of the roadway section, extending upwardly from the latter, a guard fence which may be say from four to seven feet high. There is one section of fence 9 at each end of each unit and these sections serve in connection with similar sections of other container units of a course to guard the drive-away course at its sides, parallel to the drive-aways of automobiles entering or leaving container units. Each car floor 4 may have fixed at its extreme sides at the extreme ends brackets 10 secured thereto, these brackets having notched ends, wherein a pole 11 may be placed, there being a pole 11 for each pair of brackets, at each end of a car floor 4, these being used to block cars from exit, except when removed. The car floors do not show these specifically, one only being illustrated, it being contemplated that they need not be used, or that any other type of car blocking arrangement may be used at each end of car floors 4. In any construction or use, the usual braking equipment of automobiles, may be used to prevent movement of cars, except when desired to be removed.

Refering now to Figures 4, 5, 6 and 7, which show the travel elevator unit or travel unit which is a part of my device, this unit is generally designated in the drawings, as B, and the unit consists generally of two travel trucks each designated 12 each having two sets of truck wheels 13, there being four wheels in each set, and all the wheels of a truck are mounted in two lines parallel to each other and parallel also to the lines of travel of the truck wheels of the other associated truck 12 of the unit, so that thus the wheels of each travel truck 12 may roll along two rails, the wheels being flanged rail wheels so that thereby the trucks will travel along track rails and be restricted in their travel to these rails. Each set of four wheels 13 of each travel truck 12 has an associated electric motor driving means 14 which through a pair of sets of gears 15 will drive the associated four wheels and so that thus all the wheels of the travel truck, and of each travel truck of the unit, may be simultaneously driven. It is contemplated that each electric motor 14 will be a controlled means controlled to have a speed exactly similar to the speed of its associated motor means of the other travel truck 12 of the unit. This may be accomplished by any governor means, such as commonly used with motor means, and which may be incorporated with the electric motor means 14 of each travel truck 12. Each travel truck 12 has contactors 16 and 17, one receiving current for the motor means 14 and the other receiving current for the elevator motor means 18. The current for the elevator motor means 18 of each travel truck 12 may come from an intermittent or spaced contact track, as hereafter described, so that the elevator motor means 18 and thereby the elevator lifting means may be caused to operate only when contact of the contactor 17 is made with the intermittent contact track. The intermittent contact track consists of intermittently exposed conductor elements, so that current will be received thereby only at designated locations of travel of the travel unit, B. The contacts will thus be made, for the elevator motor means 18, only when the travel elevator unit B is in the position for secure elevation of a container unit.

Figure 5:
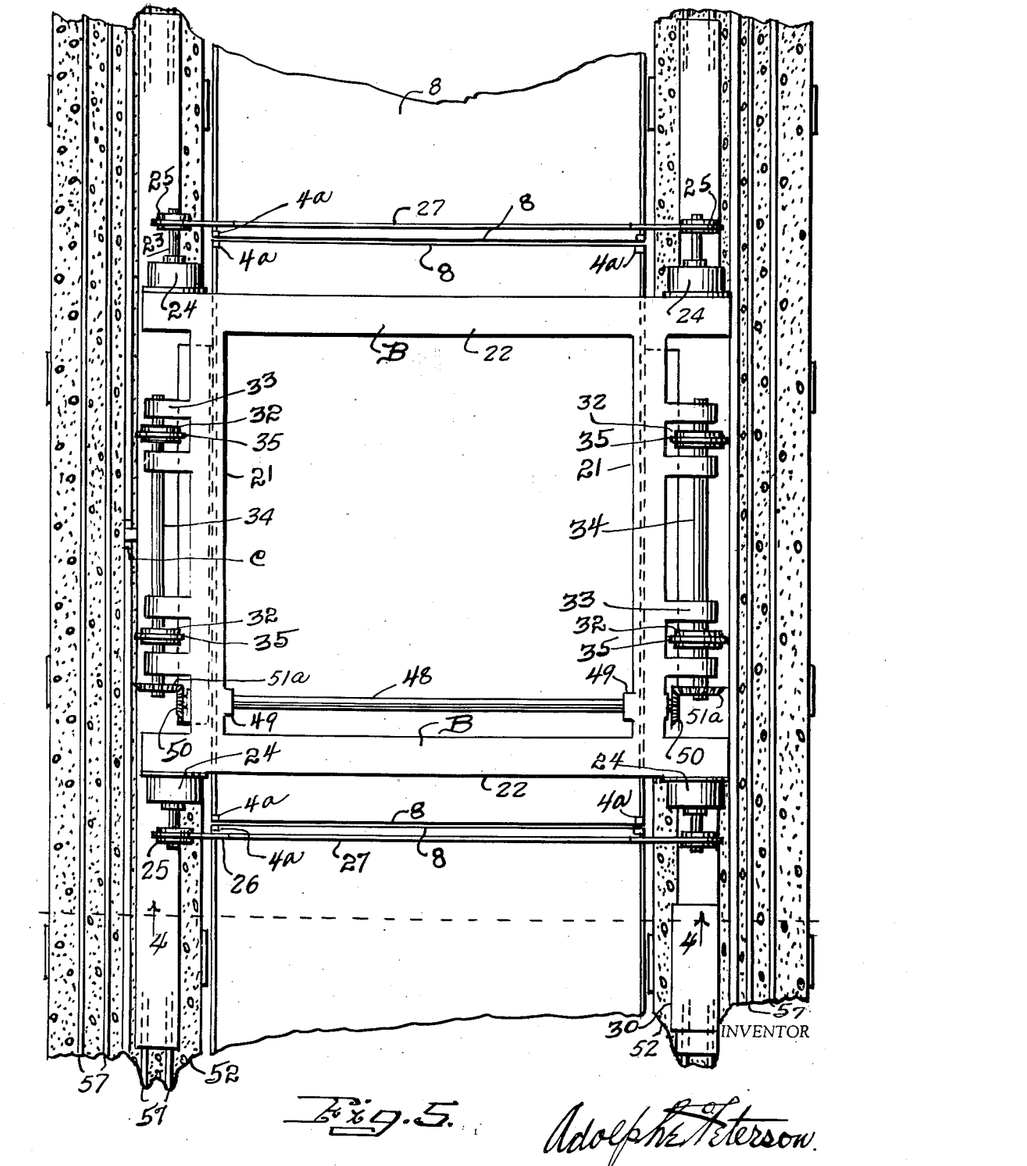
Figure 5 is a plan view of the travel unit B, showing also one roadway section 3 of one container unit A and portions of two adjoining roadway sections 8 of adjoining units A, showing also in plan view broken away sections of the structure side walls 52.
Figure 6:
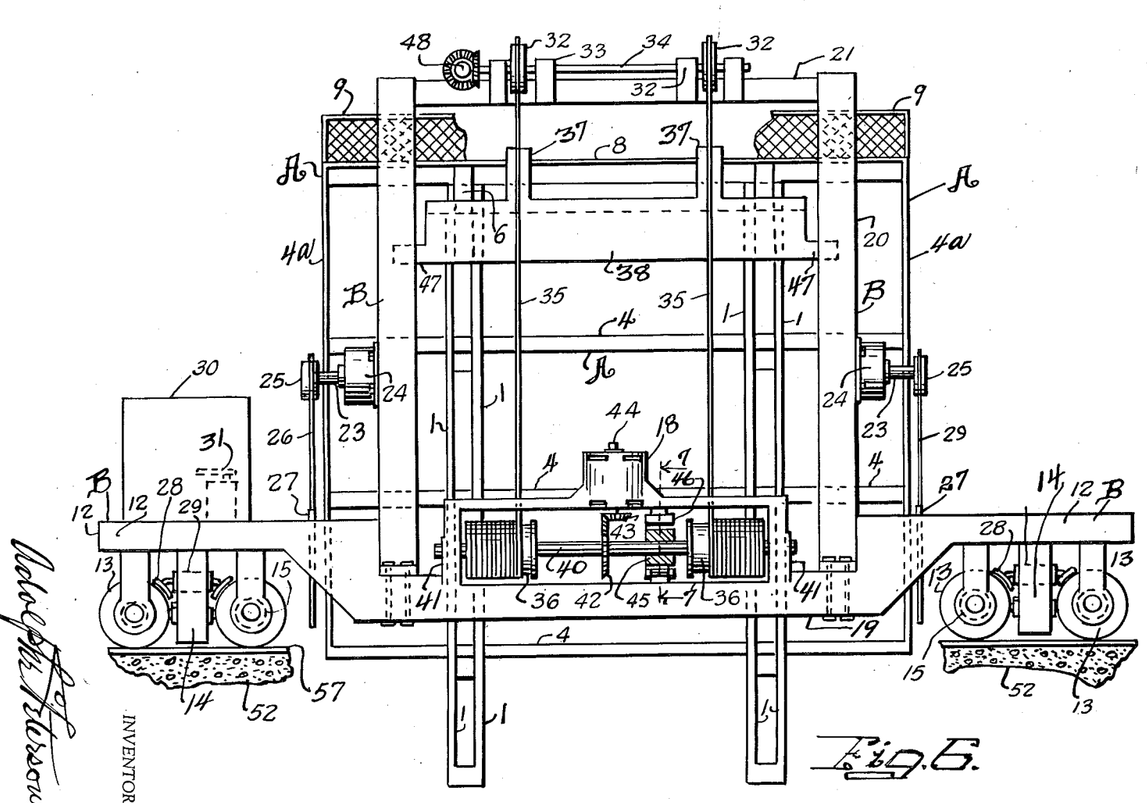
Figure 6 is a view in end elevation of the travel unit B, that is at an end at right angles to the view in Figure 4, showing also an end view of a container unit A within the structure of unit B (in elevated position), showing also small portions of a side wall structure 52 in side elevation.
Figure 7:
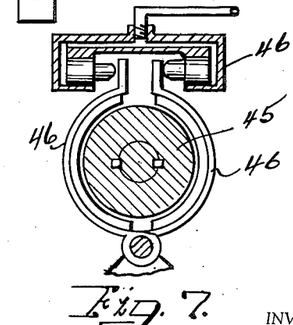
Figure 7 is a detail cross section on the line 7—7 of Figure 6 through the braking means of the elevator means.

Each travel truck 12 has the long beam member 19 which extends over and between the two sets of truck wheels 13 of the travel truck 12, and each of these long beam members 19, which are horizontally mounted (Fig. 6), have fixed upon them, extending vertically upwardly from the beam 19, two very strong posts or standards, each denoted 20, on each truck, and each of the posts 20, of each truck 12, have rigidly attached to them by welding or otherwise, the horizontal beams 21, each of which rigidly unites the tops of posts 20 of one truck 12. At the tops of the posts 20, there are beams 22, horizontally placed, and extending at right angles to the beams 21, and from the tops of posts 20 of one travel truck 12 to the tops of the posts 20 of the other parallel travel truck 12, as shown in Figure 5. The beams 22 are sufficiently long, horizontally, so that the entire width from one travel truck 12 to the other truck 12, transversely of the line of travel of the truck wheels 13, is approximately equal to the entire length of the container units A, that is transversely of a series of such container units A, and are welded to posts 20.

The posts 20, at points intermediately of their vertical length, have fixed on them gate supporting means, generally designated as 23, each of which consists of electric motors 24 each including any necessary gear reduction means, as commonly used with electric motors but not here specifically shown, and the motors 24 each have the drums 25, fixed on their driving shafts, and each of the latter has mounted and wound on it the gate cable supporting means 26, and each of these means 26 is attached at one end to one end of one of the fence gates 27. Each fence gate 27 is parallel to the other and the length of each fence gate 27 is slightly less than the distance between guard fences 9 of container units A, when in position. This pair of gates 27 is located at the forward and rearward end of the travel unit B and they are a distance apart which is slightly more than the total transverse length of container unit A, horizontally. Thus the fence gates 27 are only so long that they may in travel of unit B, pass along a series between guard fences 9 of units A, and are so far apart that when the travel unit B is located, for elevation of a unit A, a container unit A, may be lifted between the fence gates 27 without any interference by those fence gates 27. The fence gates 27, will in travel of travel unit B, travel as a pair always maintaining the same distance between them, moving with their supporting posts 20 and passing unobstructedly between guard fences 9 of units A.

Each fence gate 27 may be raised or lowered by the electric motor means 24 and gate supporting means 26, by passing current through the motors 24 by any control means for these motors 24, and carried in the operator's or control cab, as hereafter described. Thus either fence gate 27 may be raised or lowered independently of the other, and as the pilot or operator, desires, but normally these fence gates 27 are lowered to the positions shown in Figures 4 and 5 so that they are located just above the roadway formed by the roadway sections of container unit A. In the lowered positions of fence gates 27, these gates will obstruct movement of persons to the spaces between the gates 27, and will also obstruct movement of stored devices, as automobiles. When either is raised, movement of automobiles from spaces between the fence gates 27, will be permitted.

It will be noted that the beams 22 are sufficiently strong so that they serve to maintain the top ends of the posts 20 and also the travel trucks 12, in their proper associated positions in travel of unit B, and that these beams 22 are also containers for electric conduits which may be passed through them for the control of the motor means of the unit B, as one operating means. Each pair of wheels 13 in line and on each side of the travel truck 12, has associated with it brake shoes 28 and each pair of these have any applying means, generally designated 29, and which may also have its specific control means extending from the control cab, hereafter described. These brake shoe means 28 and applying means are of any type of such means as commonly known and as commonly used with any types of travel means as locomotives and trains, and are not therefore more specifically shown. Each and all are controlled by the pilot from his controller means in his pilot's cab 30, which has the controller means 31, therein, and shown only, diagrammatically as such a controller means, and this control means, in case of the brake shoes, will operate so that all of these brake shoes 28 are controlled simultaneously by the pilot and so that all are applied, in unison, or released in unison.

The beams 21 support pulley wheels 32 in bearings 33 in which axles or shafts 34 of the pulley wheels are rotatably mounted, one pair of pulley wheels 32 being mounted on and fixed on one shaft 34 and the other pair on the other shaft 34, one of the shafts 34 being approximately vertically above one travel truck 12 and the other being approximately vertically above the other travel truck 12 and each extending longitudinally of the travel truck 12. The bearings 33 are preferably of some non-frictional type as roller or ball bearings. The pulley wheels 32 support on them strong cables which are placed over them, there being four of these cables, 35, one over each pulley wheel 32, one end of each cable 35, being wound and fixed on a cable drum 36, the other end of each cable 35 being secured to one cable connection or attaching element 37 of an associated lifting hook 38 of one travel truck 12 and 39 of the other associated travel truck 12. There are four of the cable drums 36, two on each travel truck 12, the pair on each travel truck 12 being secured on an associated drum shaft 40. Each of the two drum shafts 40, there being one on each travel truck 12, is rotatably mounted in bearings 41, and has gear means 42, a bevel gear, fixed on it, the bevel gear 42 being a large gear in permanent engagement with a smaller bevel gear 43 which is on the associated motor shaft 44 of the associated electric motor 18, there being one motor 18 on each travel truck 12 to drive its drum shaft 40. The gear means drives the drum shaft 40 at a reduced rate of speed, but it should be understood that any reduction gearing, additionally, as commonly used, with electric motor means, to give a sufficient rate of reduction, so that the transmitted torque, to drum shafts 40, will be sufficient for the work to be performed, by the motors 18, may be used.

The motors 18 are supplied with current from the contact bar 17 by which current is conveyed from the intermittent contactor means C and the current is also subject to control of the pilot in his cab 30. Each drum shaft 40 has fixed on it a brake drum 45 and there is an associated brake shoe application means 46, electrically or hydraulically operated and controlled so this brake means is also under the control of the pilot in his cab 30. This cable braking means is only diagrammatically illustrated since such means are commonly known and used and used with elevator operating and control means, and it is contemplated that all such well known braking means and control means, as well as elevator operating means for operation and control of the cable lifting means, which are well known, are contemplated to be available for use and may be used in the control and operation of the cable drums 36 and their associated cables so that this lifting means will operate entirely under the control of the pilot in his cab 30 and may be started or stopped at any time, the hooks 38—39 with any weight thereon being accordingly thus under complete control of the pilot in cab 30. This control, however, is automatically subject to the restriction, that when a travel truck is moved along rails 57, the current source for the cable drum operation is automatically interrupted by the intermittent conductor rail, so that there can be no lifting operation until such contact is reestablished by location of the travel unit again for a lifting operation. This interruption of current for the lifting operation of drums 36, should not however apply to the braking means for the drum shafts and drums 36, above described, so that these braking shoes for drums 36 (their shafts 40), is always available to the pilot in cab 30, so that the cables may be stationed at any of their vertical locations, and firmly held in the selected location, whether that location be up or down, that is with respect to the ends of the cables attached to hooks 38—39.

The hooks 38—39 are very strong and are adapted to slide upward or downwardly along the inner sides of the posts or columns 20, associated, and each has a pair of projecting lugs 47 which extend to positions so they fulfill this function and also maintain the hooks 38—39 in their proper relation with the lifted weight during a lifting operation. The shafts 34 are synchronized in their movements by a shaft 48 extending over the unit between the beams 22 and rotatably mounted in bearings 49 fixed on beams 21, and this shaft 48 has bevel gears 50 fixed on it each of which is in gear with one gear 51a on one of the shafts 34, the shafts 34, being thus co-ordinated in their rotation.

Figure 8:
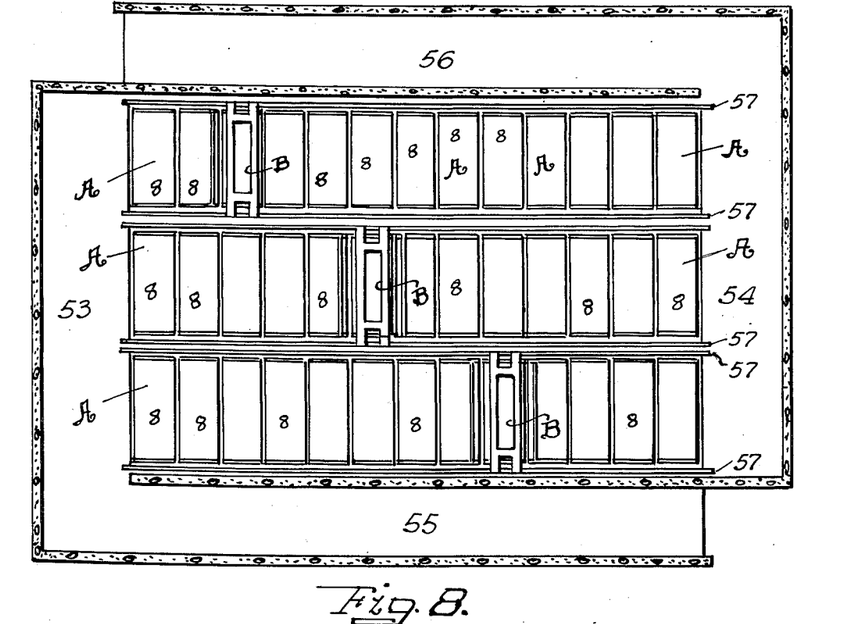
Figure 8 is a plan view of a garage structure utilizing my invention, showing three courses of container units A, each course having thirteen units A in line, and showing diagrammatically one travel unit B for each series of units A.

Referring now to Figure 8, this figure shows the use and assemblage of container units and travel elevator units in one form of construction employing my device. This figure shows in general plan view a public garage construction which may be say from 280 to 300 feet in length in one direction, including ramps and may be say from 260 to 280 feet in breadth in the other direction, at right angles, so that it would occupy the greater part of the area of one square block or all of a block of the ordinary city square or block type. This construction may be set on or in the ground of the area so that it is wholly above ground, or partially under the normal ground level, or so that the construction is substantially wholly beneath the ground level or street level, or so that in this case the roadway sections or course floor sections would, in their normal lowered positions, be approximately on the level of street surfaces adjoining. In the latter case the ramps as hereafter described would be unnecessary and the courses may discharge or receive automobiles directly from adjoining streets. As illustrated, Figure 8, it may be assumed that the ground or street level is approximately one-half way vertically of the construction. The construction and assemblage is based on a strong and heavy reenforced concrete foundation which is a so-called reenforced concrete base and this base has the container unit A support bases of reenforced concrete, denoted 51 and each of these is in the main nearly as wide horizontally as a container unit A but somewhat less as shown. The support bases for units A may be constructed as one long concrete base or as a series of bases each sufficient to support its unit A, associated, above it. There is at one side parallel to the series or line of bases for the units A, a concrete side wall 52 and there is at the other side, another concrete side wall 52 and there is one such side wall 52 on each side of each series of container units A, in the construction, but one side wall may serve a series on either side of it as illustrated by the showing of the two pairs of supporting rails on each side wall 52 in Figure 5, and also in Figure 4. All the side walls 52 in a construction are placed exactly parallel to each other and distances apart sufficiently so, that container units A may move upwardly or downwardly between them.

Container units are mounted in courses or series called container courses or series, there being three such container courses shown in Figure 8 and there are thirteen container units mounted in succession, in horizontal direction, in each course, so that, as shown Figure 8, there are 39 container units mounted in the construction. The container units are mounted in as close succession as is consistent with ease of elevation of any container units from positions in the course. And in this mounting, the slide rails or guide rails 4a of each container unit are either in loose contact with or very near to the adjoining similar guide rail of an adjoining unit. These guide rails are vertically mounted at corners only of the units. They may or may not contact with adjoining rails but they are preferably provided to guard against improper contacts of car floors 4 of adjoining units. These guide rails may instead be stationary guide rails fixed in the support bases 51, between units A.

When container units are so mounted in their courses on the support bases 51, and in their normal lowered positions, resting on the support bases, the course floor section 8 of one course of container units being at the tops will form one horizontal driving course along the tops of the units of the course and this driving course will lie between the guard fences 9 on one side and the guard fences 9 on the other side of this course, so that thus this driving course is protected against passing of automobiles or persons away from this course. The other courses, formed by the other courses of container units, there being three such courses, Figure 8, will be similar and similarly protected. Each of these courses will be open at their ends to the broad drive-way 53 at one end and 54 at the other end of the garage construction, so that automobiles may enter or depart from any one of the driving courses formed by container units by way of drive-way 53 or 54. The latter are constructed of reenforced concrete and are level with the course floor sections 8 in their normal positions. These driveways 53—54 connect by way of ramps 55 and 56, respectively, with adjoining street levels declining as necessary or rising as may be necessary to form easy driving access for automobiles to or from adjoining streets.

Travel trucks 12 of each travel unit B, of which there are four in the construction shown, are mounted on the rails 57, secured in any manner on the tops of adjoining side walls 52, there being room for and rails 57 for travel trucks of two adjoining series on each side wall top. The pair of travel trucks of each travel unit B are thus mounted to travel, one on the side wall 52 at one side, of a container unit A series, and the other on the side wall 52 at the other side of the series. In travel, the travel trucks 12 of a unit B travel over the two adjoining side walls 52, adjoining a series of units A, and in this travel the fence gates 27 of the travel unit B, will move horizontally over the series of course of units A, associated with the unit B, and will move between the opposite pairs of fences 9 of units A of the series. Thus a travel unit B may travel freely along a course, at the will of the pilot in cab 30, of the unit, and at any location, the pair of gates 27 will guard against movement of cars or persons into the area bounded by the pair of fence gates 27 and the adjacent fences 9. In such travel of travel units B the contactors 16—17 will move along and contact, one continuously and the other intermittently, with associated conductor C—C1, respectively, the latter conductors being static and fixed on the tops of the side walls 52, one set of conductors for each travel unit, or as may be determined by the particular construction. The conductors C1 are continuous and supply current continuously according to the control of the pilot by his controller in his cab 30, but the other conductor C is an intermittent conductor as shown, the intermittent conductor C being fixed on insulation base. The intermittent conductor C will contact with the contactor 17 only when the travel unit B is in the exact position where elevation of a unit A is permissible, that is in the position, where the pair of lifting hooks 38—39 will be in the exact positions for correct and efficient contact with the under side of hooks 6 of the selected container unit A, and for efficient and safe lifting of the unit A selected. When in this position, the pilot may cause electric current to flow to the electric motors 18 of the elevator means of the unit B, by means of his controller in cab 30, and operation of these motors 18 will cause operation of the motors 18 in the selected direction (for elevation), and the drum shafts 34 will rotate the cable drums 36 and draw the cables and with them the lifting hooks 38—39, upwardly, and thereby the hooks 38—39 will contact the under side of the container unit hooks 6 and lift the hooks 38—39 and the selected unit A. In this lifting movement, the travel unit is held stationary by the brake means for the wheels 13.

It will be noted that in use of this device, the storage spaces and container units will be provided with appropriate numbering designations (not shown), so that office records may be made of empty and filled storage spaces, and the cars occupying any specific space in a specific unit. Any card receipt system may be used for this purpose. Thereby, when any car owner enters the garage office, which may be located at any specific location or may be included in cabs 30, he will be assigned a specific storage space or he will demand his car from a specific storage space. With this infrorration, provided, the pliot moves the travel unit B to a specific location of a container unit A, so that fence gates 27, guard that specific location, from approach, and then by his control in cab 30, he causes the motors 18 of the elevator means to lift the selected unit A to the specific required floor level or tier, so that the floor level is level with the course floor sections 8 of adjoining units A, and when the required level is reached, the lifting motors 18 are halted and the brake means 46 is applied to the cable drums 36, and the pilot then causes either or both gates 27 to be lifted away from their positions obstructing ingress and egress from the unit A (selected), thus freeing the car selected or tier selected, from obstruction, so that any one of the cars on the tier or car floor may be removed or other cars placed therein. The poles 11, if provided in the construction, may be removed to permit movement of the cars. The cars moving into or out of the tier or floor selected, and there may be as many as four going in or out, may move along the upper surfaces of the roadway sections of the adjoining units A of the series, to or from the adjoining car platforms 53—54 and to or from the ramps 55—56, one ramp providing preferably only for entry and the other only for egress. After cars are positioned on the selected tier, the pilot may lift or drop the unit to other tiers of the same unit A, for similar entry or discharge of cars, and after the unit is filled or emptied, of such cars as are leaving, the pilot may cause the fence gates 27 to be again lowered into place, and he may cause the unit B to be moved to a new location, over any selected unit A in the series.

Figure 9:
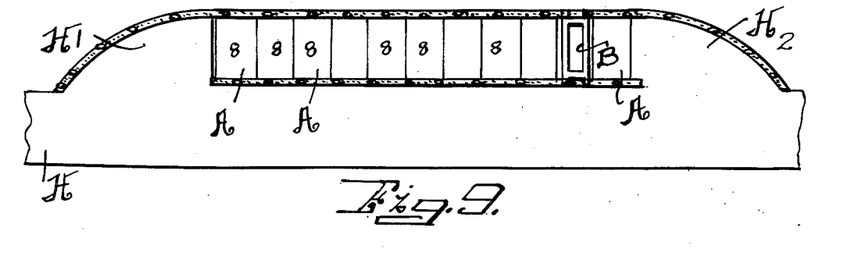
Figure 9 shows in diagrammatic plan one series of units A, alongside a highway.
Figure 10:
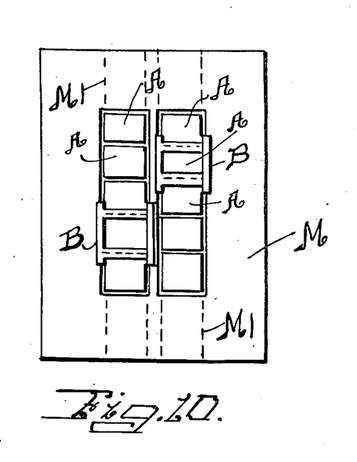
Figure 10 shows two series of units A within a building structure, in plan view.
Figure 11:
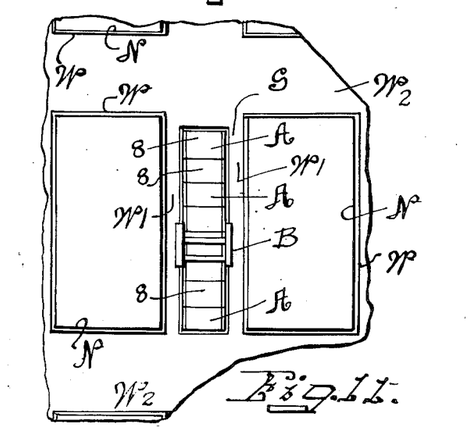

There is a conductor rail means located between each pair of rails 57, there being a pair of rails 57 on each concrete supporting wall 52. Thus each wall 52 will lie between courses of container units A on their courses of support bases 51 of concrete, but the exereme side wall of a garage construction will have only one pair of rails 57, since in the case of the end wall there will be a course of container units A only on one side of the wall. Only one course of containers A is shown in Figure 9, which figure shows one course of units A placed alongside a highway H, this one course having one travel unit B shown diagrammatically in the figure. The approaches H1 and H2 in Figure 9 may be inclined upwardly or downwardly from the highway H as may be necessary in the construction. Figure 10 shows incorporation of two courses of units A in the interior court of a building M shown in plan view with two travel units B in association with the courses. Approaches for entry and departure M1 may be at any level under any part of the superstructure of the building M. Figure 11 shows incorporation of a course of container units A in a highway or street S, there being eight units A, shown, and one travel unit B in association. The tops of units A, that is roadway sections 8 may in this case be level with the adjoining street level by which there may be approach for entry or departure, of cars. The square blocks N are the adjoining squares of building structures shown in plan view.

Figures 8, 9, 10, 11, are not differing forms of the device but show only different modes of use of the device. In Figure 11 are sidewalks W surrounding the building squares and driving lanes W1 parallel and along the sides of the unit A course, and the lanes along the sections 8 may also be used for driving, the fence gates 27 of travel unit B being raised out of the way, except when parking of a car is desired, or discharge of a car is wanted. As used in Figure 11, the units A and their support bases, would normally be below street level, adjoining except that sections 8 would be level with the street level. In Figure 11 W2 represents streets, that is their surfaces, in plan view.

Control wires and conduits of the device for control by the pilot may be run in conduits attached to the travel unit but not obstructing movement as described or operation. Control means for motors and controlling means for elevator apparatus is generally well known in connection with passenger and freight elevator constructions, and any of such control means which will facilitate operation and safety in use, may be used, in construction of the device. Any means for synchronizing the motors of the elevator means in their operation may be used. The rails 57 are shown as preferably the usual steel rails but any type of run-way for the wheels 13 of the units B, may be used, such as concrete runways, and in that case any type of wheels 13 may be used. There may be any number of storage spaces for cars in units A, but units A should be uniformly constructed, and for instance there may be as many as five to ten or even more car storage spaces horizontally of the units and as many as five to ten tiers, vertically, if desired, in any construction. It may be noted, that in any course of units A, there may be as many cars entering or departing at any time, as there are car spaces or lanes, transversely of the units A, in a structure, so that by this construction, there may be rapid parking and departure of cars, if such entry and departure is correctly supervised. The support bases 51 may have any protective covering, such as steel, for protection of the surface. I contemplate especially that travel units B may move transversely of the direction of entry and departure of cars, from storage spaces or units A.

While I have shown particular devices and combinations of devices, as used in the illustration of my device, I contemplate that any detailed device and combinations of devices may be used in the realization of my invention, without departing from the spirit and contemplation thereof, it being especially contemplated that the motor means for either the elevator means or the propulsion means of travel units B may be of any type of motor means such as gasoline or diesel engines, any such motor means being carried on the travel unit and traveling therewith, instead of the electric motor means, as is shown.

What I claim is:

1. An automotive unit storage means, comprising: a horizontal mounting base, a travel unit mounted to travel parallel to said horizontal mounting base and motive power means for said travel unit to move it in the direction parallel to said horizontal mounting base; an elevator means carried on said travel unit to be carried horizontally with said travel unit in movement of the travel unit parallel to said horizontal mounting base, motive power means for said elevator means to actuate said elevator means, and container engaging means incorporated with said elevator means for vertical movement by said elevator means; a plural number of individual automotive unit storage conainers mounted on said horizontal mounting base and placed in close succession horizontally in the direction of travel of said travel unit, each said container having a supporting frame and a cover over said supporting frame and storage space within said supporting frame and entry or departure openings at opposite lateral ends of said storage space and engageable elements fixed on said supporting frame; the said engageable elements of all said storage containers being in normal lowered positions of the storage containers, substantially in line horizontally and parallel to the direction of travel of said travel unit and substantially uniformly placed vertically with reference to the horizontal movement of said travel unit, the said container engaging means and the said engageable elements being aligned for inter-association; said elevator means and said containers having inter-association to permit selection of any of said containers for elevation from said mounting base by said elevator means by movement of said travel unit parallel to said series of storage containers and by engagement of said container engaging means with said engageable elements of a selected container, the said covers of said containers when said containers are in the lowermost positions supported on said mounting base forming a roadway for entry and departure of automotive units from an elevated container.

2. An automotive unit storage means, comprising: a horizontal mounting base, a series of storage containers mounted on said horizontal mounting base in horizontal succession, each storage container having a supporting frame and engageable elements fixed on said supporting frame and storage space within said supporting frame and storage supporting means in said supporting frame to store a plural number of automotive units in spaced relation transversely of the storage container; the said engageable elements of all said storage containers being so located that there are two horizontal in line series of engageable elements, one in line series having an engageable element of each storage container and the other in line series having an engageable element of each storage container; each storage container having super-imposed over it an individual roadway section, each said roadway section being mounted for support in the lower-most position of the storage container and being elevatable with the associated storage container, each storage container being arranged to permit entry or egress at its side, the said roadway sections in normal lower-most positions forming substantially a continuous horizontal roadway over the storage containers; a travel unit movable horizontally and parallel relatively to said series of storage containers; the said travel unit having motor means for moving it horizontally in said horizontal movement; an elevator means carried on said travel unit, the said elevator means having a pair of inter-connected container engaging means spaced apart horizontally and transversely of the direction of travel of the travel unit, motive power means for said elevator means to actuate said elevator means for vertical movement of said container engaging means in unison; the said travel unit and the said series of storage containers having inter-association, such that one of said container engaging means travels in movement of the travel unit in the line of one in line series of engageable elements of said storage containers, that the other of said container engaging means travels in movement of the travel unit in the line of the other in line series of engageable elements of said storage containers, and such that said travel unit and its said elevator means and container engaging means may be positioned, by the horizontal movement of the travel unit, one container engaging means in position for engaging an engageable element of the selected container in one said in line series, and the other container engaging means for engaging an engageable element of the selected container in the other said in line series, for such selected elevation of a selected container by engagement of the said pair of container engaging means with the engageable elements of the selected container, and such that any thus selected storage container may be elevated to place a selected space of the storage container above the level of the said roadway sections not so elevated for movement of automotive units to or from selected space.

3. An automotive unit storage means, comprising; a horizontal mounting base, a travel unit movable horizontally and parallel to said horizontal mounting base, an elevator means mounted on said travel unit to be carried horizontally with said travel unit in movement of the latter parallel to said horizontal mounting base and motive power means for said elevator means to elevate said elevator means, the said elevator means having a pair of engaging means, one engaging means located substantially at one side of said travel unit and the other at the other side of said travel unit; a plural number of individual automotive unit storage containers mounted on said horizontal mounting base and placed in close succession horizontally in the direction of travel of said travel unit, each said container having a supporting frame and a roadway section mounted horizontally over said supporting frame, each said container having storage space within said supporting frame and a pair of engageable means, one engageable means attached to the supporting frame and projecting laterally from one side of the supporting frame and the other attached to the supporting frame and projecting laterally from the other side of the supporting frame, the said engageable means of all containers at one lateral side being in normal positions uniformly positioned vertically and the said engageable means of all containers at the other side being in normal positions uniformly positioned vertically; the said elevator means of said travel unit having a normal position in horizontal travel of the travel unit such that the engaging means of the elevator means may travel under said engageable elements of said series of containers; motive power means carried on said travel unit to propel it to any selected position in engageable position with any selected container so that the pair of engaging means of the elevator means may contact the pair of engageable means of the selected container to elevate the selected container into such position that storage space thereof will be aligned with space immediately above the normal level of roadway sections when storage containers are in their normal positions on said mounting base; and adjacent access roadway areas over which automotive units may travel to or from elevated storage space.

4. A storage means of the character described, comprising; a horizontal mounting base constituting a supporting base; a series of storage containers, each having a supporting frame by which it is supported and by which it may be mounted on said horizontal mounting base, the said storage containers being placed in close succession horizontally in line on said horizontal mounting base, each said storage container having storage space and storage supporting means to store a plural number of stored units in spaced relation transversely of the direction of said series of storage containers, each storage container having superimposed over it an individual roadway section, each said roadway section being mounted for support in its lowermost position and being elevatable therefrom, each storage container being formed to permit entry or egress at its side, the said roadway sections in lowermost positions forming substantially a continuous horizontal roadway; a travel unit movable relatively to said series of storage containers and parallel to said horizontal mounting base and said formed roadway, the said travel unit having motor means carried on said travel unit for propulsion thereof to selected position for elevation of any selected storage container, the said travel unit having elevator means carried thereon and a pair of engaging means interconnected with the elevator means, one engaging means located approximately at one lateral side of said series of storage containers and the other engaging means located approximately at the opposite lateral side of said series of storage containers; each said storage container having secured substantially at one end thereof and approximately in the line of travel of one of said engaging means, an engageable means in which said associated engaging means may be engaged for elevation of the container, and having secured substantially at the other end thereof and approximately in the line of travel of the other engaging means an engageable means in which said associated engaging means may be engaged for elevation of the container; the said pair of engaging means being engageable with the pair of engageable means of a selected storage container when the travel unit is positioned relatively to the selected container for engagement of the engaging means with its engageable means, and the said elevator means having motive power means therefor to procure elevation of the elevator means and with it a selected storage container to an elevated position with reference to said roadway sections in normal positions such that there may be ingress or egress of a stored unit or units to or from said storage space and over said formed roadway.

5. All of the means as described and as claimed in claim 4, and in combination; fence means carried on said travel unit to move therewith to form fence obstruction on said formed roadway transversely thereof at any position of travel of said travel unit, and means for removal of said fence means from the position obstructing an elevated container to permit movement of an automotive unit to or from a storage space within said elevated container.

6. A horizontal mounting base, an elevating means adapted for travel parallel to said horizontal mounting base, said elevating means including engaging elements, a plural number of storage containers placed in close succession horizontally adjacent and parallel to said horizontal mounting base, each said container having a supporting frame and storage space within said supporting frame and engageable elements on said supporting frame, each said container having provision for entry or departure at its side, the said elevating means being movable to a position pertinent to any one of said containers to elevate such selected container by engagement of said engaging elements with the engageable elements of the selected container, and an enclosure means carried by said elevating means to enclose horizontally at its side or sides a space within which a selected container may be elevated, the said last named enclosure means having means by which it may alternatively be placed to permit access or egress from storage space within a container elevated in said enclosed space.

7. All of the means as described and as claimed in claim 4 and in combination; a fence enclosure means over said formed roadway movable with said travel unit in horizontal movement parallel to said horizontal mounting base to positions over any of said containers so that the enclosure means normally obstructs entry into space enclosed by said enclosure from adjoining roadway sections, the said fence enclosure means including means by which any of it or sections of it are movable out of the position obstructing entrance or egress from storage space or space within said fence enclosure means.

References Cited in the file of this patent

UNITED STATES PATENTS

| | | |
|---|---|---|
| 1,303,978 | Smith | May 20, 1919 |
| 1,527,562 | Kolbe | Feb. 24, 1925 |
| 1,667,467 | Young | Apr. 24, 1928 |
| 1,851,502 | Ferris et al. | Mar. 29, 1932 |
| 2,139,182 | Bledsoe | Dec. 6, 1938 |